United States Patent [19]
Harris, Jr. et al.

[11] Patent Number: 5,754,769
[45] Date of Patent: May 19, 1998

[54] COUPLING BETWEEN NON-CTOS HOST AND CTOS NETWORK

[75] Inventors: George W. Harris, Jr., Mountain View; Shari J. Nolan, San Jose, both of Calif.

[73] Assignee: Unisys Corp., Blue Bell, Pa.

[21] Appl. No.: 783,594

[22] Filed: Jan. 13, 1997

Related U.S. Application Data

[62] Division of Ser. No. 637,465, Apr. 25, 1996, Pat. No. 5,594,870, which is a division of Ser. No. 996,986, Dec. 23, 1992, Pat. No. 5,513,325.

[51] Int. Cl.⁶ .................................................. G06F 13/00
[52] U.S. Cl. .................................. 395/200.8; 395/309
[58] Field of Search ..................... 395/200.31, 200.68, 395/200.79, 200.8, 200.83, 800.01, 800.28, 821, 856, 280, 309, 250, 490; 370/401–407; 371/20.1, 20.6; 380/3, 4

[56] References Cited

U.S. PATENT DOCUMENTS

| | | | |
|---|---|---|---|
| 4,672,570 | 6/1987 | Benken | 395/200.8 |
| 5,153,884 | 10/1992 | Lucak et al. | 371/32 |
| 5,299,313 | 3/1994 | Petersen et al. | 395/200.64 |
| 5,299,314 | 3/1994 | Gates | 395/200.8 |
| 5,321,819 | 6/1994 | Szczepanek | 395/200.58 |

*Primary Examiner*—Alpesh M. Shah
*Attorney, Agent, or Firm*—John McCormack; Mark Starr

[57] ABSTRACT

An adapter arrangement for internetworking a non-CTOS computer means with a network of CTOS terminals, including a system-bus, this arrangement being adapted for introduction into, and cooperation with, the non-CTOS computer and comprising CTOS-net bus means for transferring signals from the system-bus plus a communication control stage for controlling and transferring signals to/from the CTOS network and a net-interface stage.

30 Claims, 14 Drawing Sheets

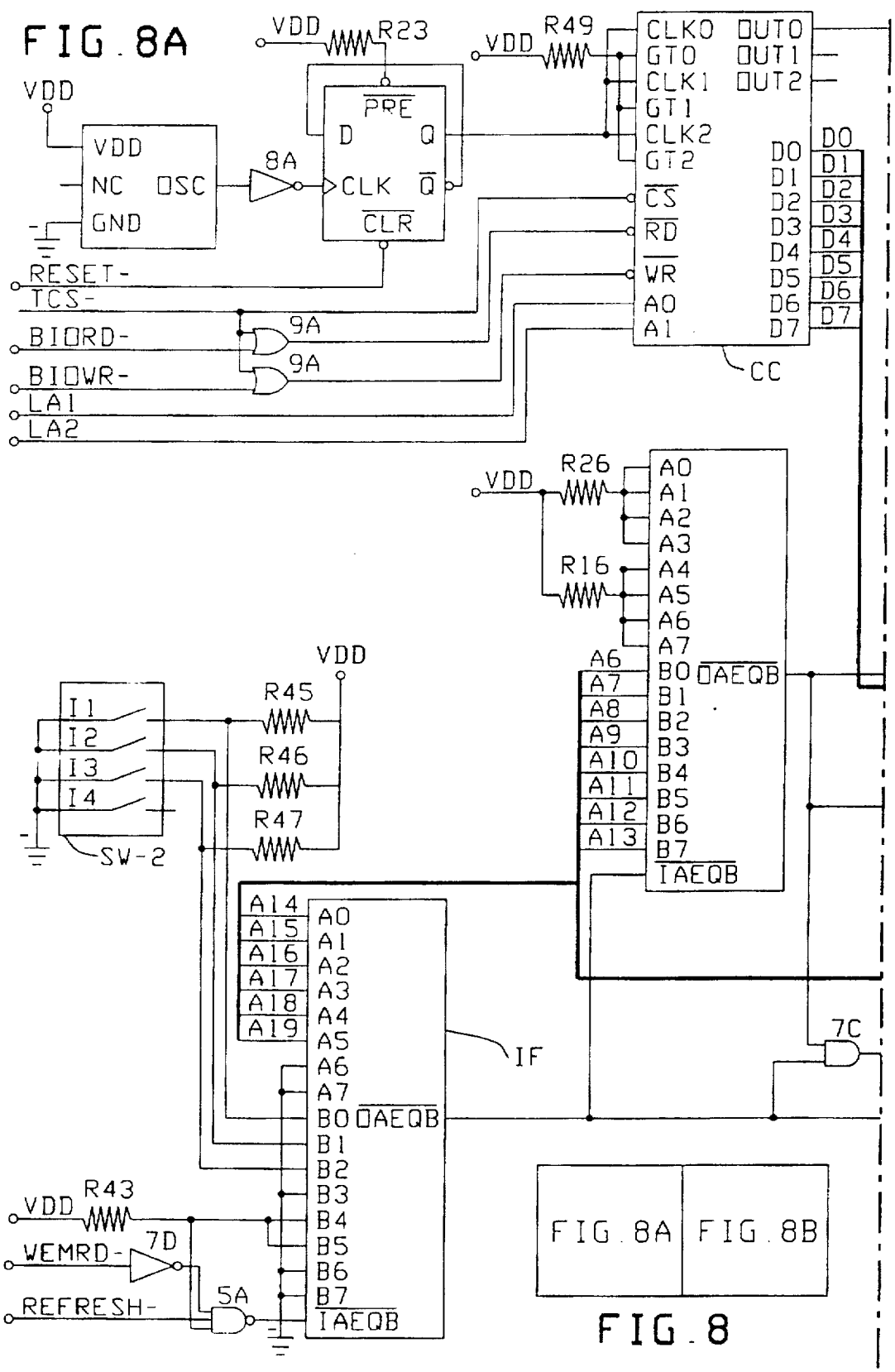

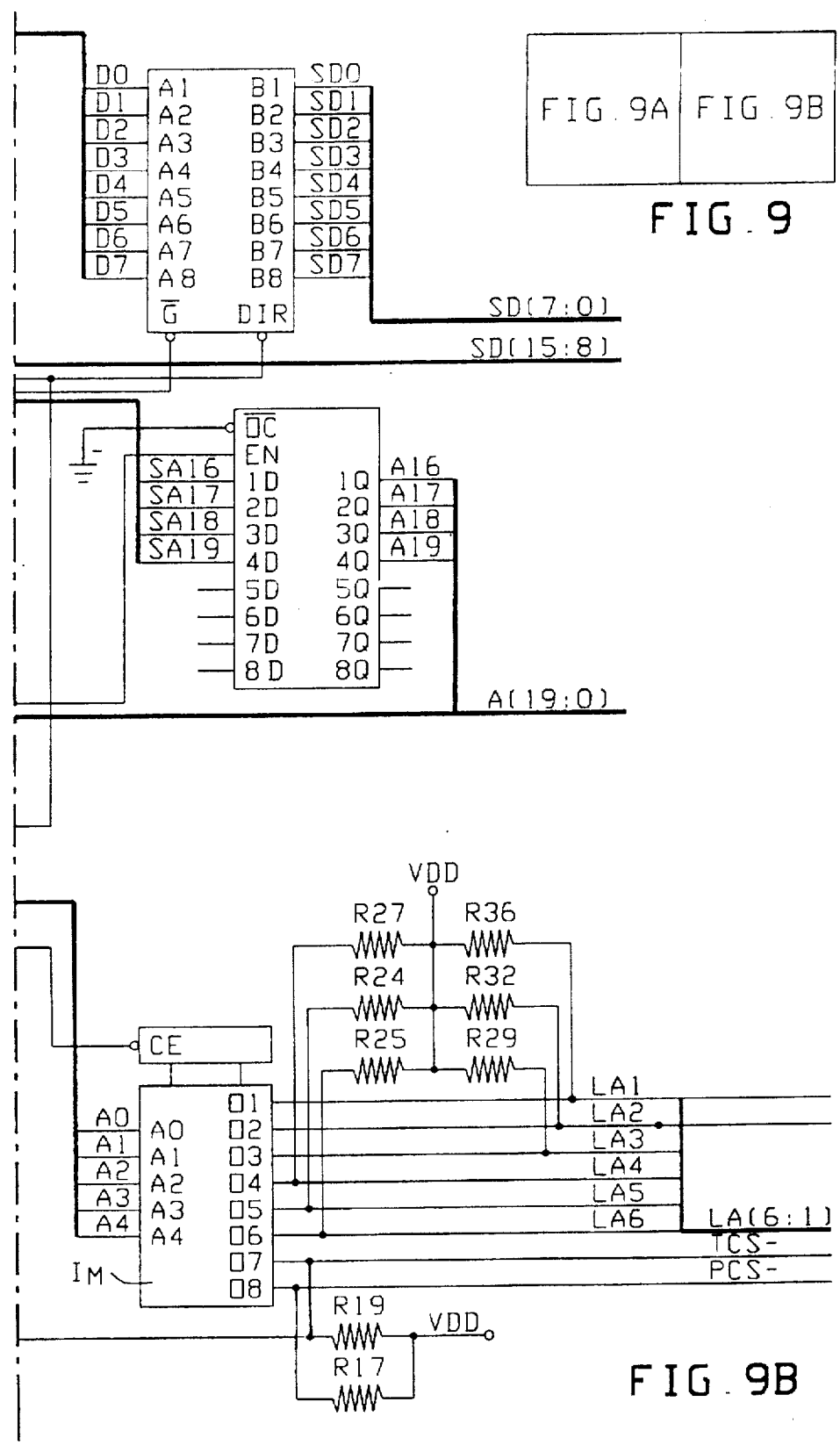

COUPLING BETWEEN NON-CTOS HOST AND CTOS NETWORK

This is a division of Ser. No. 08/637,465, filed Apr. 25, 1996, now U.S. Pat. No. 5,594,870, which is a division of Ser. No. 07/996,986, filed Dec. 23, 1992, now U.S. Pat. No. 5,513,325.

This case involves an adapter system facilitating integration of a computer (e.g. a PC) into a network, particularly a CTOS network.

This case also involves software (e.g. for use in such a network) enabling such integration and to associated securing means for frustrating the ready copying of such systems and software.

BACKGROUND, FEATURES

Workers are aware that the computer software is often supplied to data processing users with the code embodied in a read only memory (ROM). The use of ROM based software is common in personal computers and other applications of microcomputers (e.g. video games). ROM based software for these systems includes systems software and application software. Significant investment is required to develop the programs for such devices, (e.g. those incorporated into ROM's); thus the ease with which ROM contents can be read and copied becomes a concern.

The copying of programs stored in ROM chips can be frustrated by various approaches. One approach is to encrypt the addresses and the data transmitted between the ROM and the central processor unit (CPU) of a data processing system; but here, a person who knows, or can determine, the encryption circuitry can defeat the encryption. Another approach is to monitor program flow and generate address signals within the ROM itself; so that an attempt to read information from the ROM, without executing the program itself, can be detected, and only valid execution paths allowed.

A program providing such monitoring is described in U.S. Pat. No. 4,377,844 (issued to Kaufman on Mar. 22, 1983). The Kaufman patent teaches an apparatus which translates an address from a conventional address register, in a conventional central processing unit, to an internal address for addressing the internal RON memory. The address translating apparatus includes means which are responsive to a current external memory address and a signal generated in response to a previous memory address to provide the current internal memory address. This address translating apparatus also requires the use of an auxiliary memory device. But a problem with this address translator is that it requires a complicated arrangement of counters and address-generation circuits. The circuit complexity makes it impractical for an inexpensive ROM based software package.

Another approach (e.g. see U.S. Pat. No. 5,155,829 to Koo) is to use a digital memory system in which nonvolatile memory (ROM) will have a 2n addressable memory locations. Thus, an n-bit address is required to address each of the memory locations of the ROM. A buffer memory, or equivalent, is also provided. The buffer memory is a read/write, or random access memory (RAM), memory which is smaller than the ROM memory, i.e., has fewer addressable memory locations. Both the ROM memory and the buffer memory store the same number of bits in each addressable memory location. An external address of n-m bits is applied to the memory system from a central processor unit, for example, and is used to address the buffer memory. The value of m is determined by the relative size of the buffer memory.

An address controller is provided to which external addresses are applied. In response to certain predetermined external addresses, the controller will cause the contents of a portion of the read only memory to be transferred into the buffer memory. The address controller, however, will only apply the external addresses received by the address controller to the buffer memory. As a result, the external address on the address bus is the address of a memory location in the buffer memory, the contents of buffer memory changing as a function of certain predetermined conditions occurring; i.e., certain addresses or address sequences being applied to the address controller.

Thus, attempts to obtain the contents of a memory location from the buffer memory will not necessarily reproduce the same data each time an addressable location in the buffer memory is addressed. This arrangement can also expand the size of the memory addressable by a system with n-m address signals. Also, the address controller is provided with means for detecting certain addresses which should not be used at any time, such as that of an unused location, or for detecting when the external addresses are applied to the controller in an improper manner or sequence.

When improper attempts to address the memory system are executed, the addresses applied to the buffer memory are no longer in proper sequence (although the deviation from a correct program sequence is not immediately evident). The data read-out from the memory system will then no longer have a reproducible correlation between the externally applied addresses and the information stored in the ROM memory. But this (Koo) approach is unduly complex and expensive.

Thus, a need is recognized for a relatively simple system to prevent programs stored in ROM devices from being copied, a system that is relatively economical and which doesn't interfere with the operation of the associated computer system.

Accordingly, it is an object hereof to address at least some of the foregoing needs and to provide one or several of the foregoing, and other, solutions. A more particular object is to provide a secure memory system in which attempts to improperly access the programs stored therein are frustrated. Another object is to provide a secure memory system which is relatively simple and inexpensive to implement.

Another object is to provide a secure ROM memory system in which improper ("illegal") attempts to access memory will "lock up" the associated computer operation.

BRIEF DESCRIPTION OF THE DRAWINGS

These and other features and advantages of the present invention will be appreciated by workers as they become better understood by reference to the following detailed description of the present preferred embodiments which should be considered in conjunction with the accompanying drawings, wherein like reference symbols denote like elements.

FIG. 3 is a schematic block diagram of salient elements of the adapter unit of FIG. 2, while

The aforementioned and other objects, or some thereof, may be realized according to this disclosure by providing a Boot ROM programmed to include a prescribed "signature code" which is used to enable operation of the CTOS operating system and associated network. Preferably, the same code is also embedded in the CTOS operating code which is to be transferred into the subject PC (non-CTOS type, to be integrated into a given CTOS network, e.g. via a CTOS server, by an adapter card inserted into an open slot in the PC, this card including the subject Boot ROM). This CTOS operating code is adapted to compare its own "signature code" with that of the Boot ROM—and prevent CTOS operation unless it finds a "match".

Figure 1:
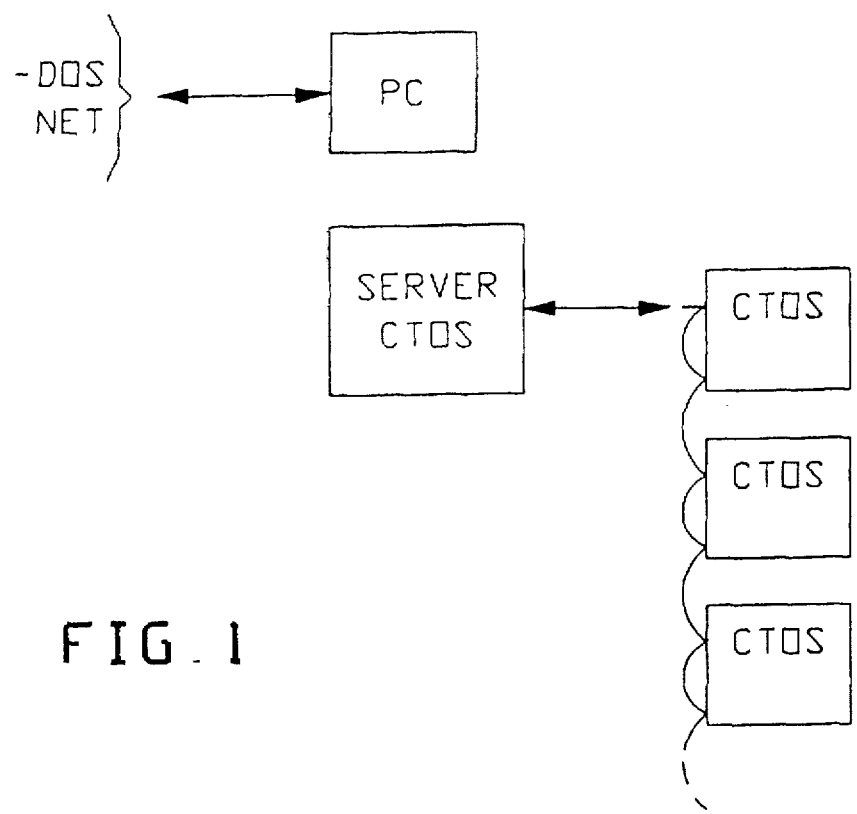
FIG. 1 is a schematic simplified block diagram of a "non-CTOS" (e.g. -DOS) type personal computer (PC) and associated network, along with a CTOS-server and associated CTOS network.

FIG. 1 functionally illustrates a relatively conventional "non-CTOS" personal computer (e.g. preferably-DOS type) including a slot for a "Network Adapter" card (or "NET card" NC) adapted according to this invention, to integrate the PC into a network, N-W, of CTOS Terminals (i.e. workstations).

Figure 2:
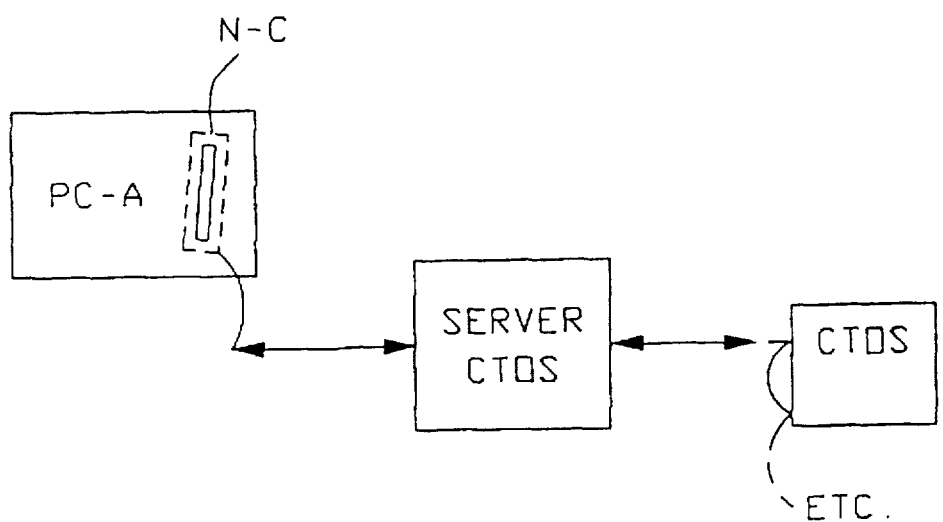
FIG. 2 is a schematic block diagram showing of such a personal computer as modified by a CTOS network adapter unit according to the invention, along with a CTOS-server and associated CTOS network coupled to this unit.

This array will be understood as particularly adapted for use with (interface with) a "CTOS Telecluster Network" (to be understood as illustrated functionally in FIG. 2). "NET card" NC will be understood as an "expansion board" adapted for use in (insertion into any expansion slot of) a PC/AT or EISA compatible computer. It operates only in 16-bit mode. "NET card" NC will preferably connect such a computer to a Unisys/Convergent "CTOS Cluster Network", allowing the sharing of resources available through a Master Workstation or server (see in FIG. 2). Special software is provided at both the Master and the PC-NC terminal to enable operation in the CTOS environment.

As a salient feature, "NET card" NC includes a Boot ROM to allow diskless workstations to boot from memory resources of the Master Workstation (e.g. as in FIG. 2).

As another feature, "NET card" NC preferably incorporates a CTOS "TeleCluster" network, while continuing to support an RS485 cabling scheme. "TeleCluster" is a Local Area Network (LAN) product (e.g. see U.S. Pat. No. 4,918, 688) that communicates high speed data (e.g. over twisted pair lines at 3.7 Mbps, 1.8 Mbps, and 307 Kbps). "TeleCluster" products are capable of communicating over a variety of cable media and are designed to be compatible with CTOS-based RS485 Clusters, and PC workstations networked with related (e.g. ClusterCard and ClusterShare) network products; being a transparent alternative for the RS485 cluster cabling scheme, and therefore needing no software or hardware changes. Using "NET card" NC changes the Bus topology of the Cluster into a "Star configured" network. "Telecluster" capabilities include transmission over an unshielded twisted pair, as well as over shielded cable, plus automatic configuring connections for up to 23 stations from one server, or up to two servers, and their stations, per Hub; it has increased distance capabilities when compared with standard LANs.

Figure 3:
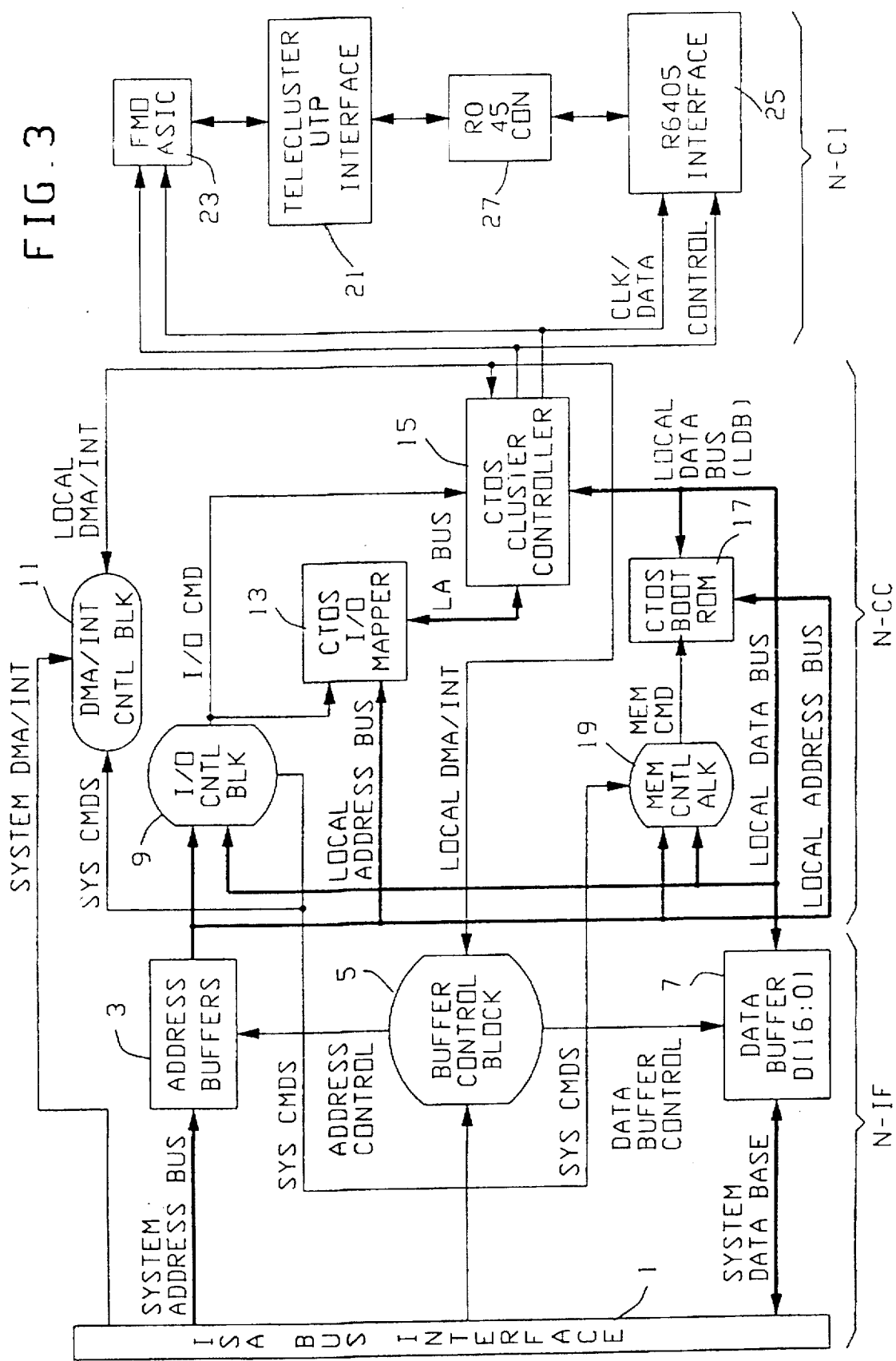

—"NET Card," Block Diagram, FIG. 3:

FIG. 3 is a block diagram functionally interrelating salient elements of "Net Card" NC, which will be understood to receive/send (address, data, control) signals via a ISA/EISA bus 1.

Bus 1 is coupled to an Address Buffer stage 3 (for driving the local address bus), to a Data Buffer stage 7 (for driving the local data bus) and to a Buffer Control Block 5 (for signal flow control). The buffers isolate busses (e.g. to prevent a loading problem).

System commands from bus 1, plus address signals (from Buffer 3) and data (from 7) are applied to control a Boot ROM 17 via an associated Memory Control block 19; and also applied to operate CTOS I/O Mapper stage 13 (chip I/O M, FIG. 4) via an associated I/O Control block 9. System commands are also applied to a DMA/interface Control block 11 to generate local DMA (direct memory access) and interrupt signals.

Output from blocks 11, 13, 17 are applied to a CTOS Cluster Controller stage 15 (chip CL, FIG. 4) to operate the CTOS Cluster Controller.

Mapper 13 will be understood to receive conventional address-inputs and organize them in the usual way to map memory and apply a mapped address output to CTOS Cluster Controller stage 15, where the parallel inputs are converted to serial output (clock and data) for transmission over network twisted pair lines (e.g. within an office suite).

An FMO stage 23 (ASIC chip) preprocesses these signals for transmission over the twisted pair lines (e.g. to encode, transmit clock and data into an "FMO format").

Telecluster Interface 21 functions to filter-out noise and to pulse-shape signals before such transmission over the unshielded twisted pair; as well as to filter signals at T.C. Interface 21 (from an interface 27).

Stage 25 is the RS485 interface ("Gray cable") and functions to interface the CTOS Cluster Controller to shielded "multi-drop Gray cable". "NET Card" NC can be used in several types of environments such as RS485 Cluster, "TeleCluster", or a mixed environment. Depending on the connection desired there will be different cable assemblies to make the "NET Card" compatible with existing products as well as new products.

There are two RJ45 shielded connectors (jacks) on "NET Card" NC. Both jacks accept 1-pair, 2-pair, 3-pair, or 4-pair, RJ45/RJ11 type plugs. For each connector, the two center conductors are used (#4, 5, below) for connection to Tele-Cluster; while the outer pins (#1, 2, 7, 8—below) are used for RS485 signals. Pins 190 3, #6 are not connected.

The connector pin assignments for the RJ45 Jack Interface may be tabulated as follows:

| Pin # | Signal Name |
| --- | --- |
| 1 | CLK (clock) |
| 2 | CLK- |
| 3 | NC1 (no conn.) |
| 4 | TIP |
| 5 | RING |
| 6 | NC2 (no conn.) |
| 7 | DAT |
| 8 | DAT-(data) |

"NET Card" NC may be connected via in-house telephone wiring to a Hub (e.g. max. distance: 1200 feet at 307 Kb/1.8 Mb, 800 feet at 3.7 Mb rate).

Boot ROM:

As a feature of "NET Card" NC, Boot Rom 17 (B-R) provides the required software for the system to boot from a Master. The Boot Rom is accessed in byte mode only, and stores 16 Kbytes (max.), with the last 64 bytes used for memory mapped I/O. A four-position dip switch SW2 (FIG. 8) maps the Boot Rom in one of eight locations between 0C000H–0DFFFFH; thus an address may be selected that does not conflict with another resident I/O expansion board. Because values of these locations are variable, the last 64 bytes should not be included in the checksum.

For purposes of identification, locations 0006H–001CH of the Boot Rom are to contain the following information.

| BASE ADDRESS | DATA | COMMENTS |
|---|---|---|
| 0000H | 55 | |
| 0001H | AA | |
| 0002H | Length | 512 byte blocks |
| 0003H–0005H | Jump Inst. | |
| 0006H–000FH | "Unisys" | Company ID |
| 0010H–001AH | "Net Card" | Card Name |
| 001DH | | Program Area |

Thus, where a PC with disk storage could normally run-DOS, adding Card NC with the Boot ROM, alternatively, enables the PC to boot-in CTOS (from CTOS Server) to allow it to dialogue (only) with a CTOS Server or like Master,—and, thereby, with a CTOS network. Or this PC can simulate a CTOS terminal, and run CTOS. (Net Card never functions as a Server here; though it could if appropriately modified.) If the Server has dedicated hard disk memory, it can function as Master Memory, and can be accessed (shared) by all disk-less terminals in the network.

Boot Rom, B-R, provides firmware adapted to be enabled by appropriate ("signature") software signals to allow card NC to operate—and operation cannot proceed without receipt of the correct prescribed "signature signals" at B-R, (otherwise cannot "boot" the PC, i.e. cannot run the CTOS software downloaded from the server to the PC). Rom B-R is adapted, as known in the art, to be given a preset "signature code" in its memory, this to be automatically compared with the "signature code" input from CTOS; thus, a decision is made as to whether there is a "match" ("Go") or "no match" ("No Go"),—the "match" responsively enabling the downloaded CTOS software to operate on the PC. (Signature-check will not block downloading, but only prevent running of CTOS operating system in main memory; i.e. if its signature code is not "matched" it will "lock" the system, and indicate this condition; e.g. on screen.)

As workers will realize, one may substitute a reprogrammable unit (e.g. FROM) for ROM B-R, allowing the "signature code" to be changed.

Figure 4:
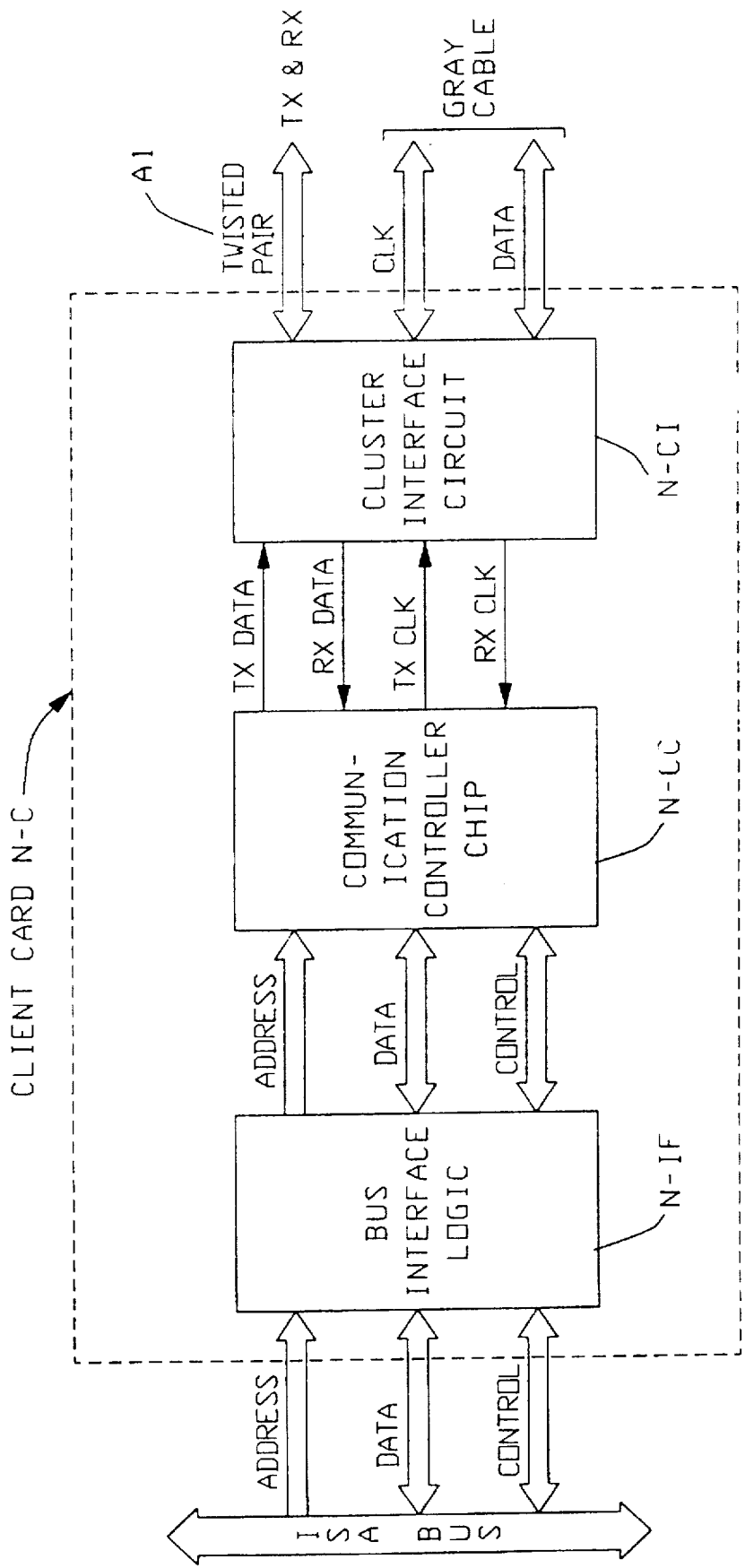
FIG. 4 is a more generalized functional block diagram of FIG. 3.

FIG. 4 is a rather generalized functional block diagram of portions of card NC (see also in FIG. 3), with "ISA bus" understood as delivering address/data/control signals (e.g. from the PC system bus) to an associated interface stage N-IF which is adapted, as known in the art, to transfer these address/data/control signals to/from a related communication controller stage N-cc. Stage Ncc functions as a communication controller and will be seen as adapted to generate Tx clock signals and Tx data (transfer from bus logic stage N-IF and convert, e.g. from parallel to serial, and "packetize") and transfer them to a cluster-interface stage N-CI adapted to handle signals to/from the net connections A-1: i.e. the "twisted pair" connector (Tx, Rx) or the "Grey cable" (clock, data). Tx: stands for Transmit; Rx: for receive.

OPERATION:

"NET Card" NC is characterized by three main operations: initialization, transmit mode, and receive mode. Once card NC has been initialized, it will assume either transmit mode or receive mode.

INITIALIZATION:

Board NC is initialized on "power up", or "system reset". Then the I/O addresses are determined (see system BIOS); next, the Interrupt and DMA (direct memory access) channels are determined. As part of initialization, an AT type computer will locate the Boot Rom on Net Card NC. The software in the Boot Rom will then read the switches to determine the status of the board—by this the software is made aware of the hardware I/O addresses and the DMA and Interrupt channels which the user has selected by the switches.

RECEIVE MODE:

Before serial data can be received, the CPU must set up the system to be in "receive mode". First, the Parameter Control Register (PCR) and the Address Register (AR) of the Cluster Controller chip 15 (FIG. 7) are initialized. Then, activation of the Receive Enable (RXE) and DMA Receive Enable (DMARXE) signals set the data path and the internal FIFO of Chip 15 for "receive mode". The data on Receiver Serial Input (RXSI) is shifted in on the rising edge of the Receiver Clock signal (RXC). The hardware will then receive data and transfer it into memory.

An interrupt will occur when the DMA is completed, or if any errors occur during the receive cycle. When the last DMA cycle is completed, "External End of Cycle" (XEOP) and "DMA Acknowledge" (DACK, see chip D-C also) are issued to the Controller Chip 15; in turn, the Communications Interrupt Line (COMMINTR) is asserted (to DMA chip D-C, FIG. 7), signifying "end-of-transmission". Then, "Receive Enable" (RXE) and "DMA Receive Enable" (DMARXE) should be de-asserted (RX: net signals, input to card NC).

TRANSMIT MODE:

Transmitting is like "receiving-in-reverse", except that, in addition to moving the data to be transmitted, the DMA Manager must write some of the bits into the transmit control register (inside chip 15). First, the Parameter Control Register (PCR) of the Controller chip 15 is initialized, and the external DMA Controller is set up to fill DMA (from memory) with the characters to be transmitted.

Then, activation of the "Transmit Enable" (TXE) and "DMA Transmit Enable" (DMATXE) signals set the data path and the internal FIFO of the Controller Chip 15 for "transmit mode". The Transmit Data Buffer (TXDB) should be loaded with the first character of the message. Each character is serialized in the Transmitter Shift Register (TXSR, within Controller chip) and transmitted on occurrence of "Transmit Serial OUT" (TXSO).

After the last character has been loaded into the TXDB and sent to the TXSR, "Transmit End Of Message" (TEOM) is set. When the DMA Controller has counted-down, an internal "End of Process" (EOP) signal will be generated, and in turn the Communications Interrupt Line (COMMINTR) will be asserted, signifying "end-of-transmission" (at DMA chip D-C). Then "Transmit Enable" (TXE) and "DMA Transmit Enable" (DMATXE) should be de-asserted.

The eight-position dip switch SW-1 (FIG. 8) is used for the I/O location, INT level, and DMA (Direct Memory Access) channel. Positions P5 and P6 select the DMA channel, P7 and P8 select the interrupt level, and P1–P4 map the location of the I/O addresses. Some switch combinations are not legal per the AT bus specification.

The four-position dip switch SW-2 (FIG. 8) maps the Boot Rom in one of eight locations between 0C0000H–0DFFFFH. There are no preferred switch settings. Some switch combinations are not legal per the AT bus specification.

Figure 5:
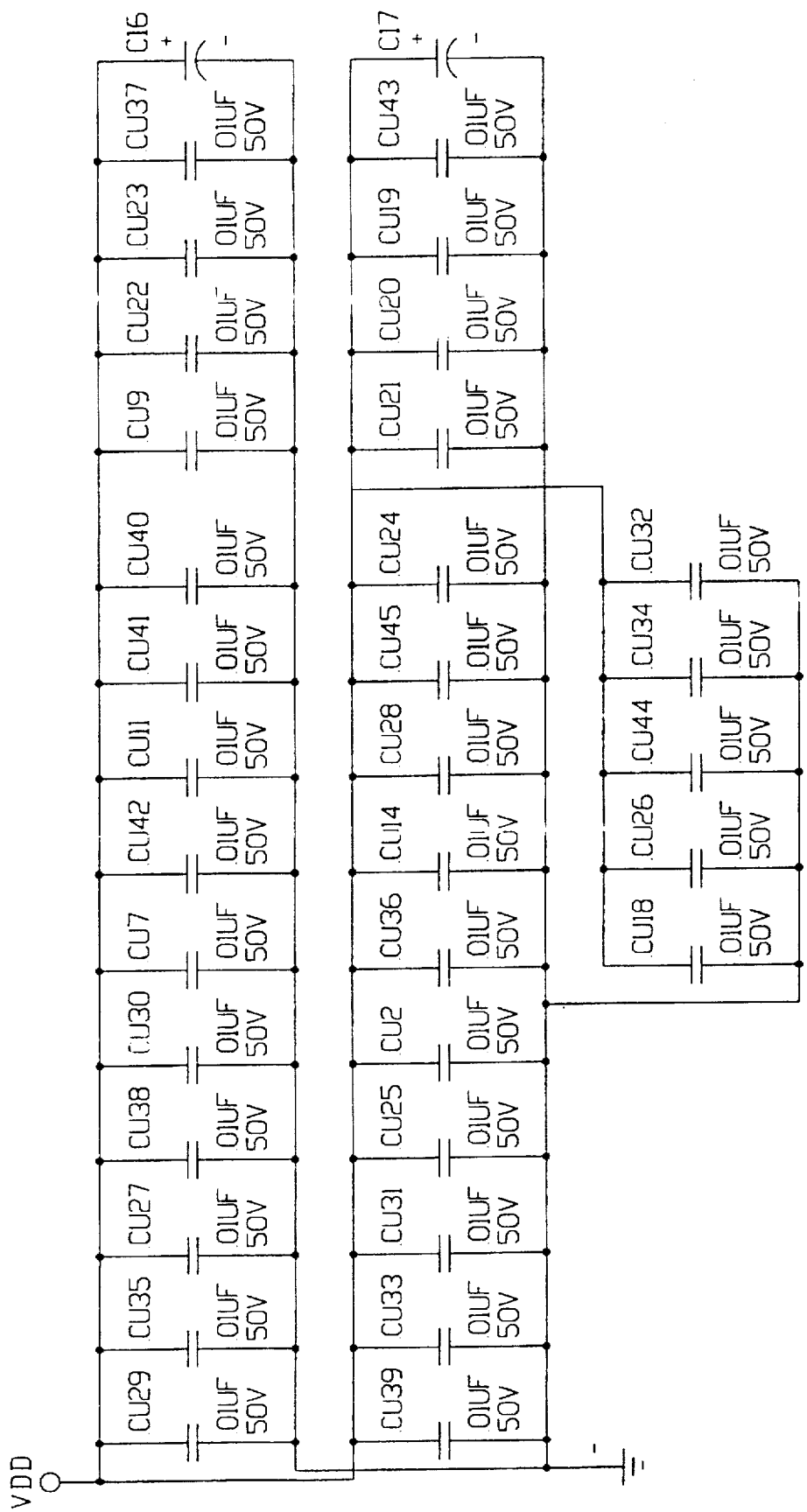
FIGS. 5–10 show preferred circuit implementation of portions of the adapter unit of FIGS. 3, 4.
Figure 6:
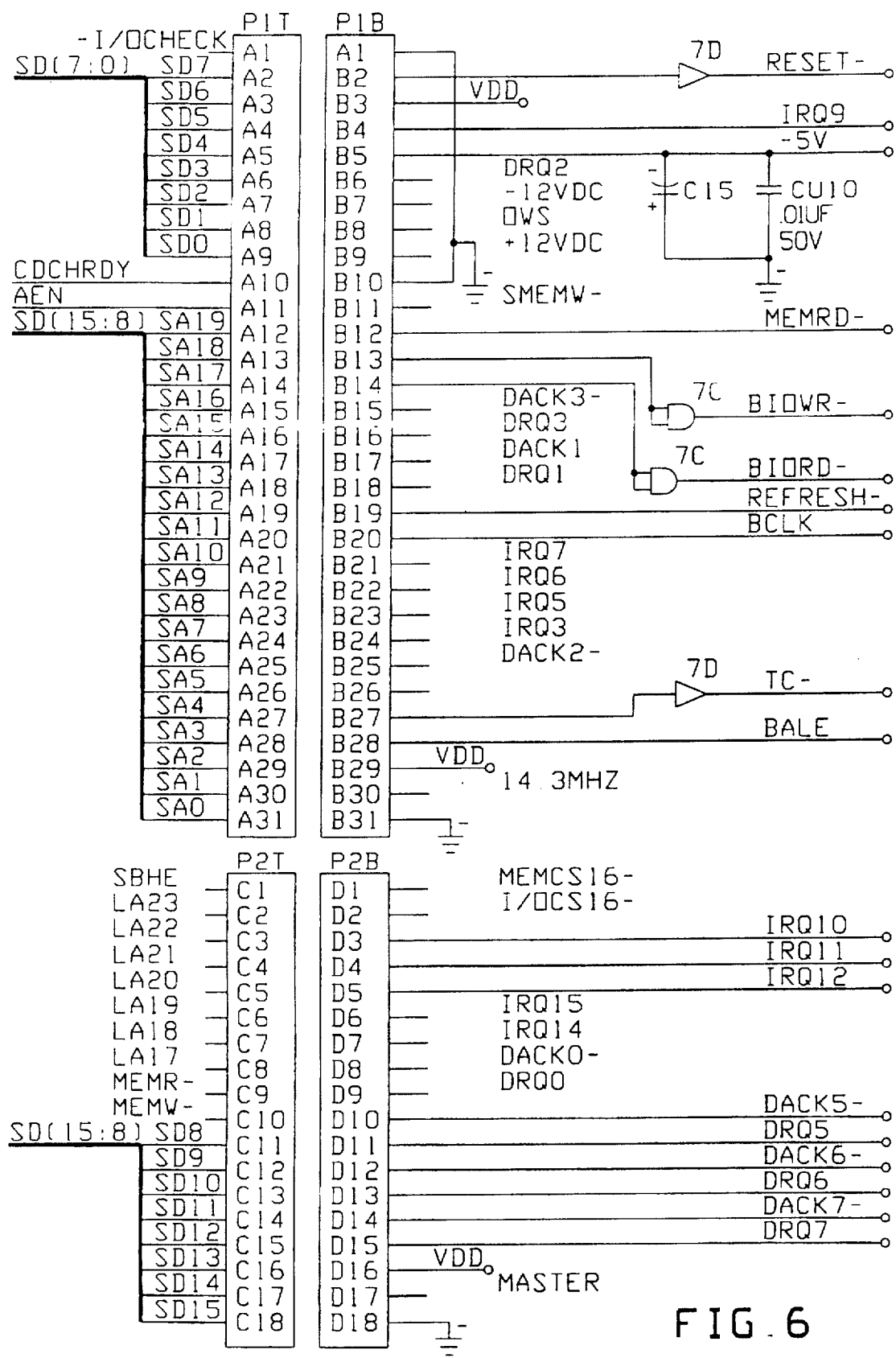
Figure 7A:
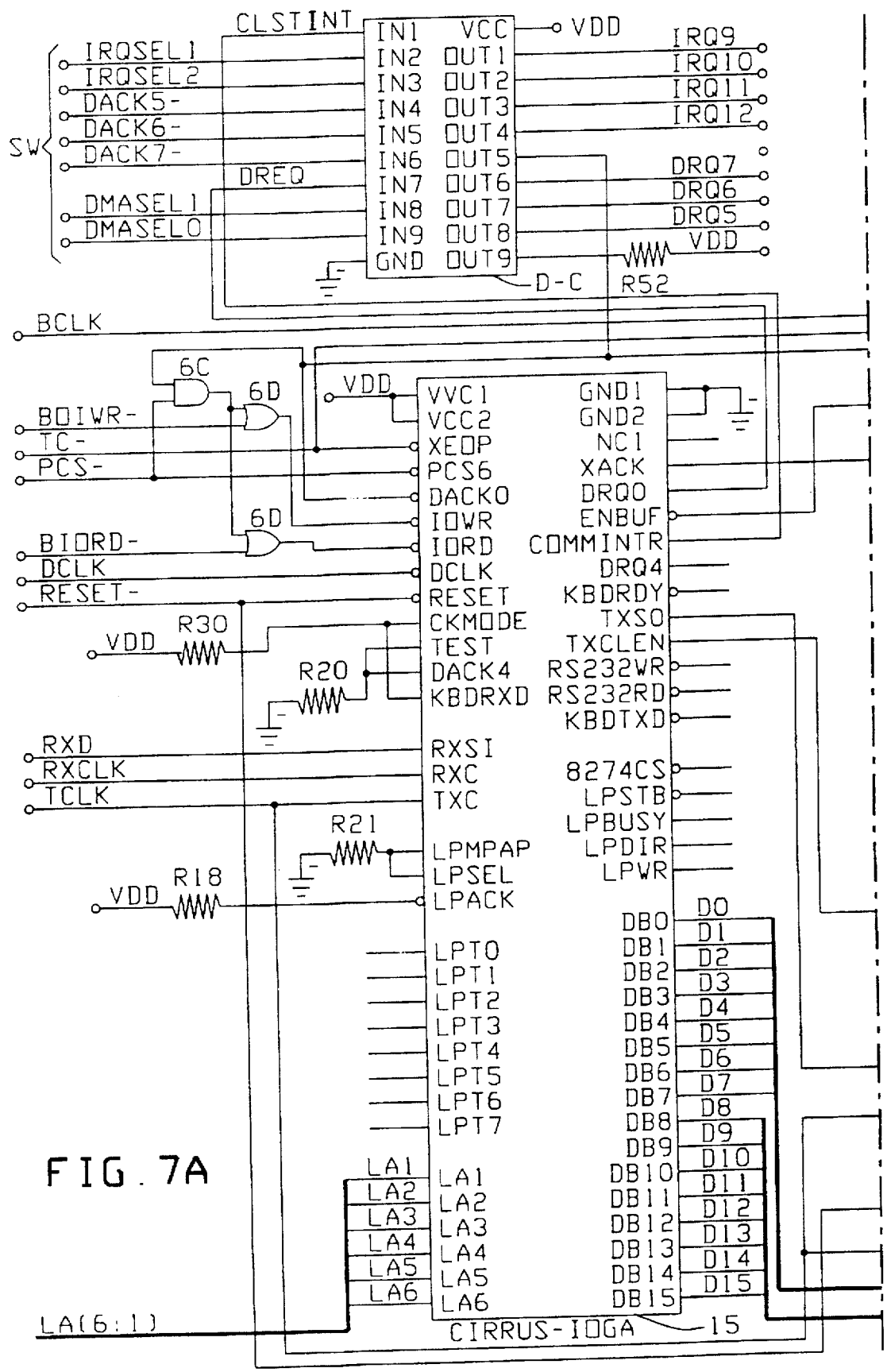
Figure 7B:
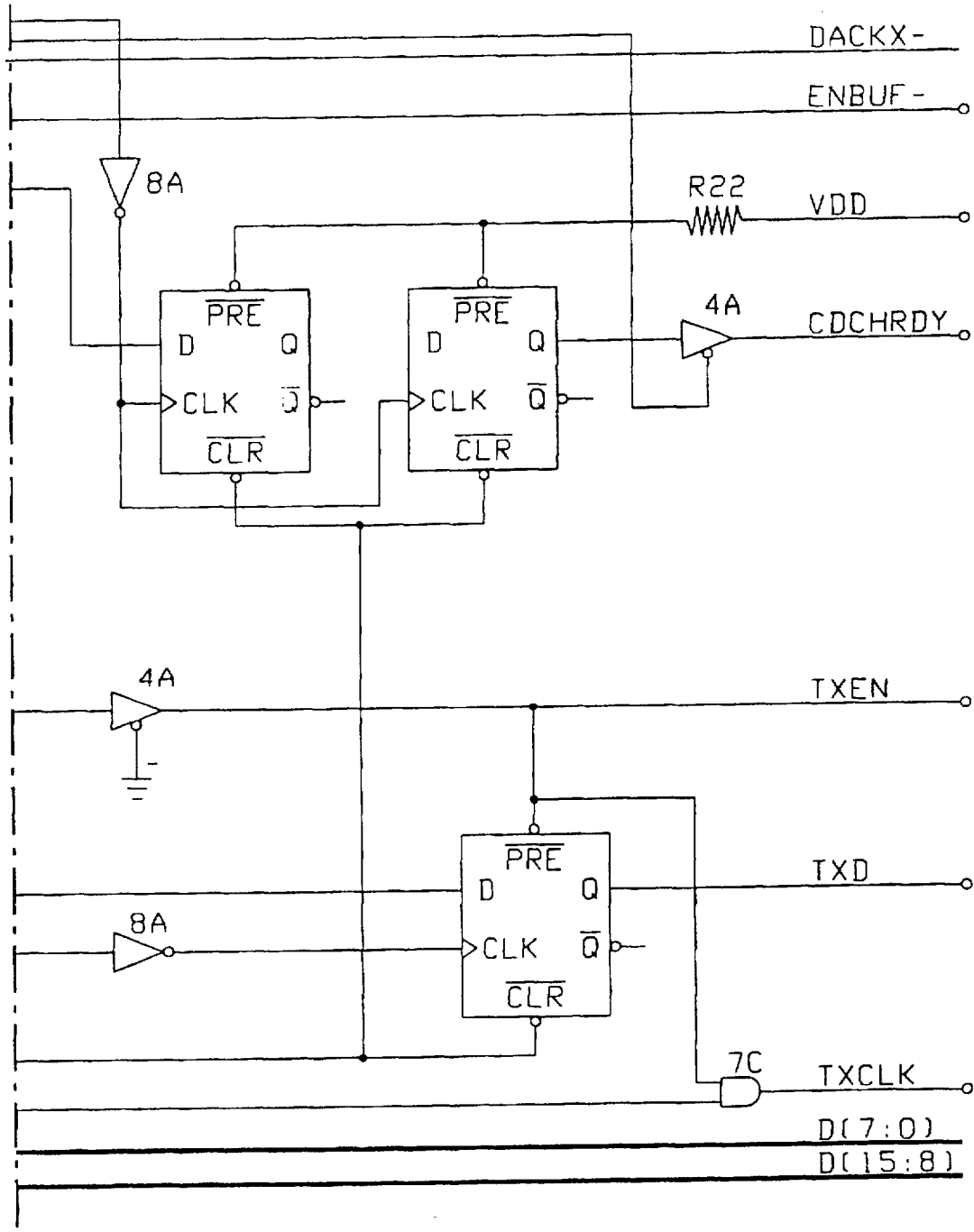
Figure 8B:
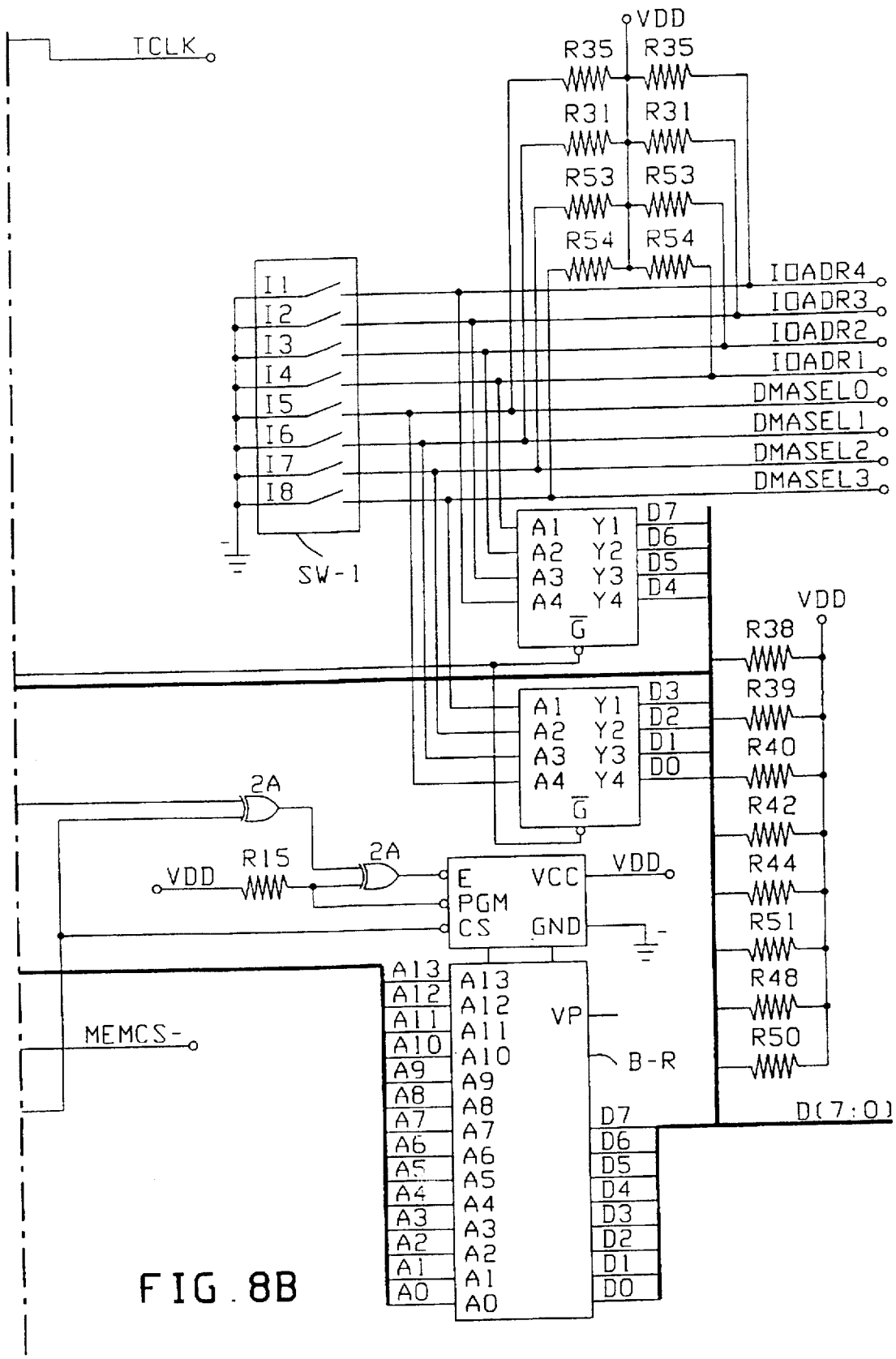
Figure 9A:
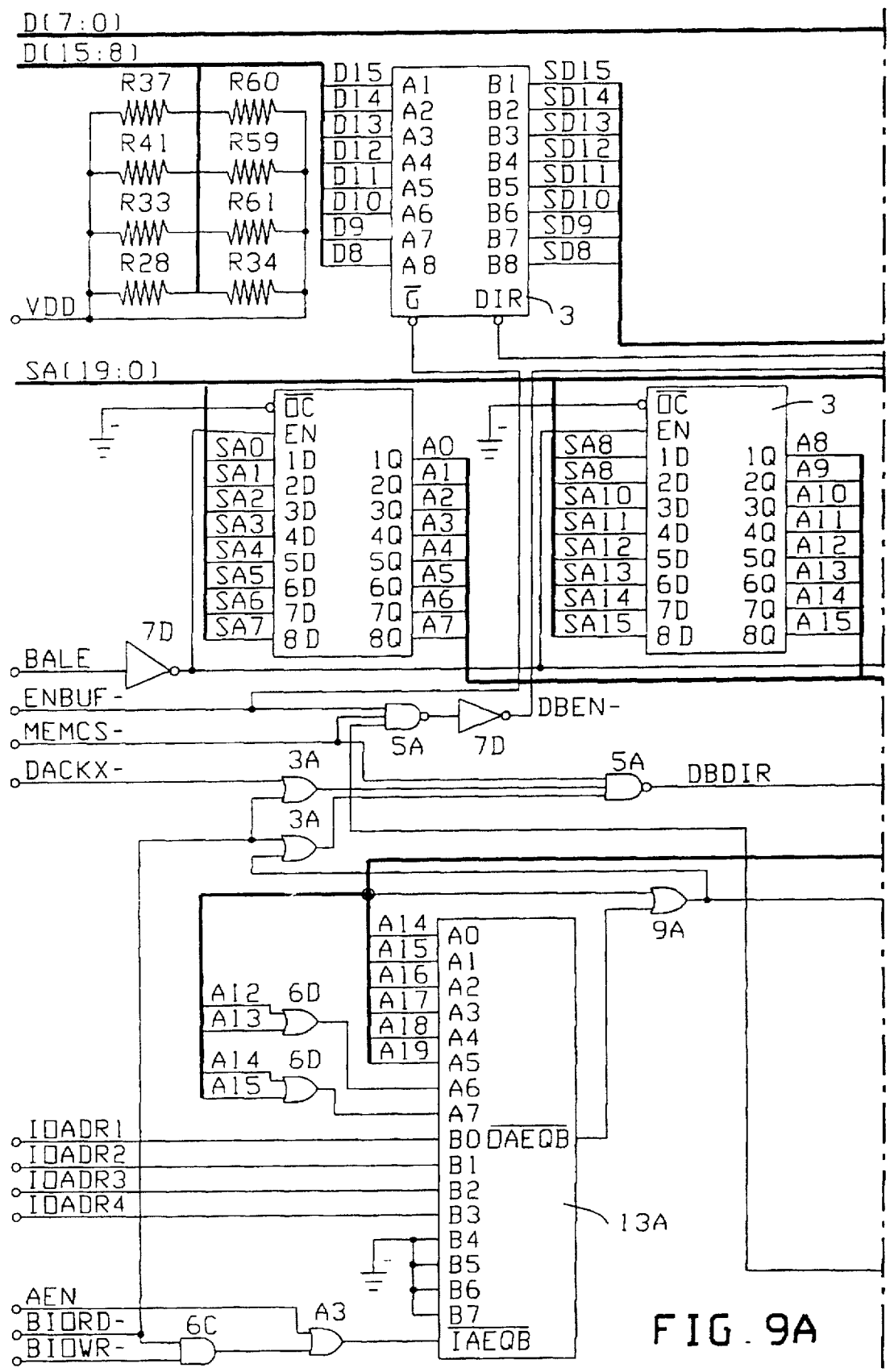
Figures 10, 10C:
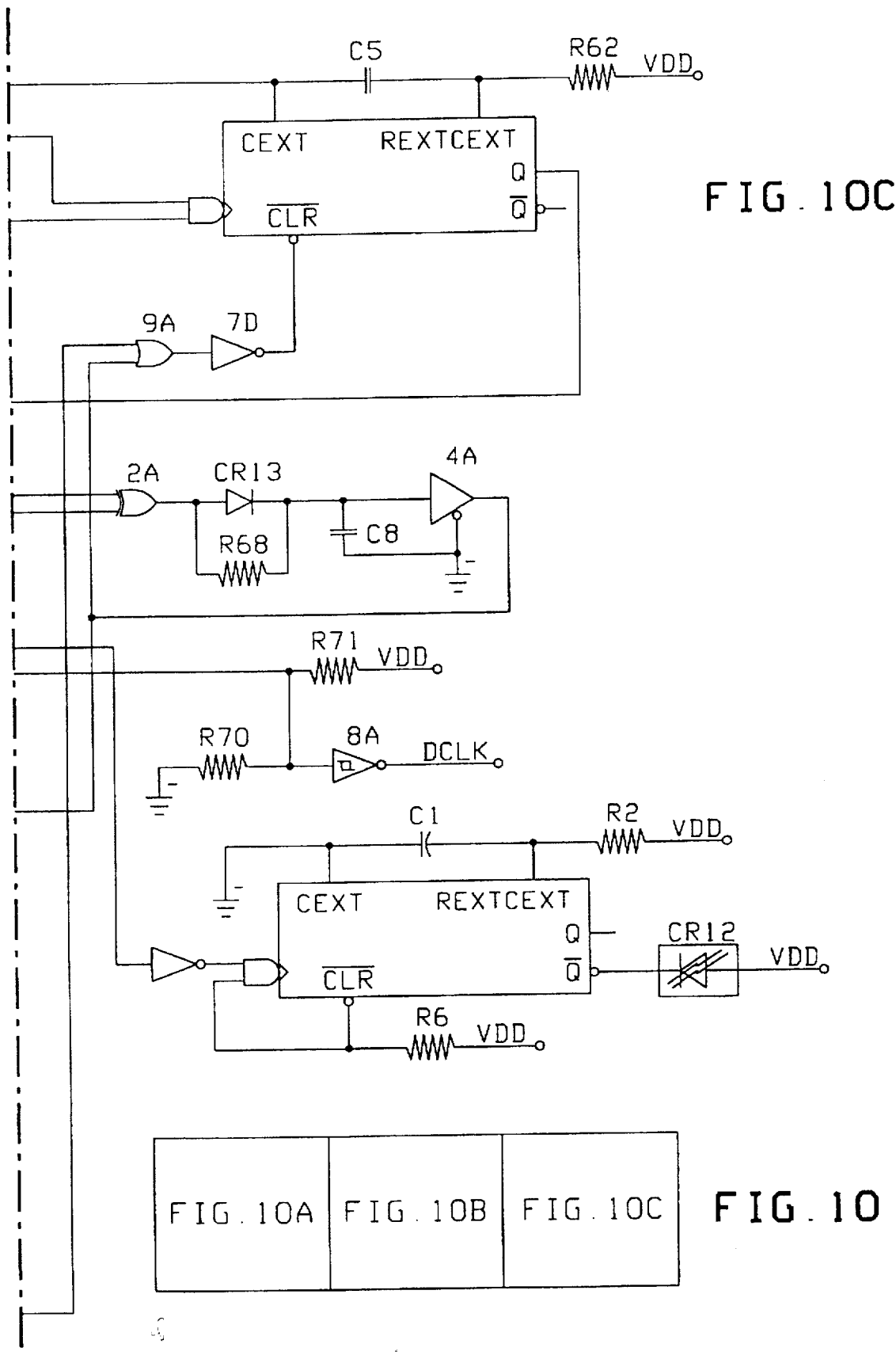
Figure 10A:
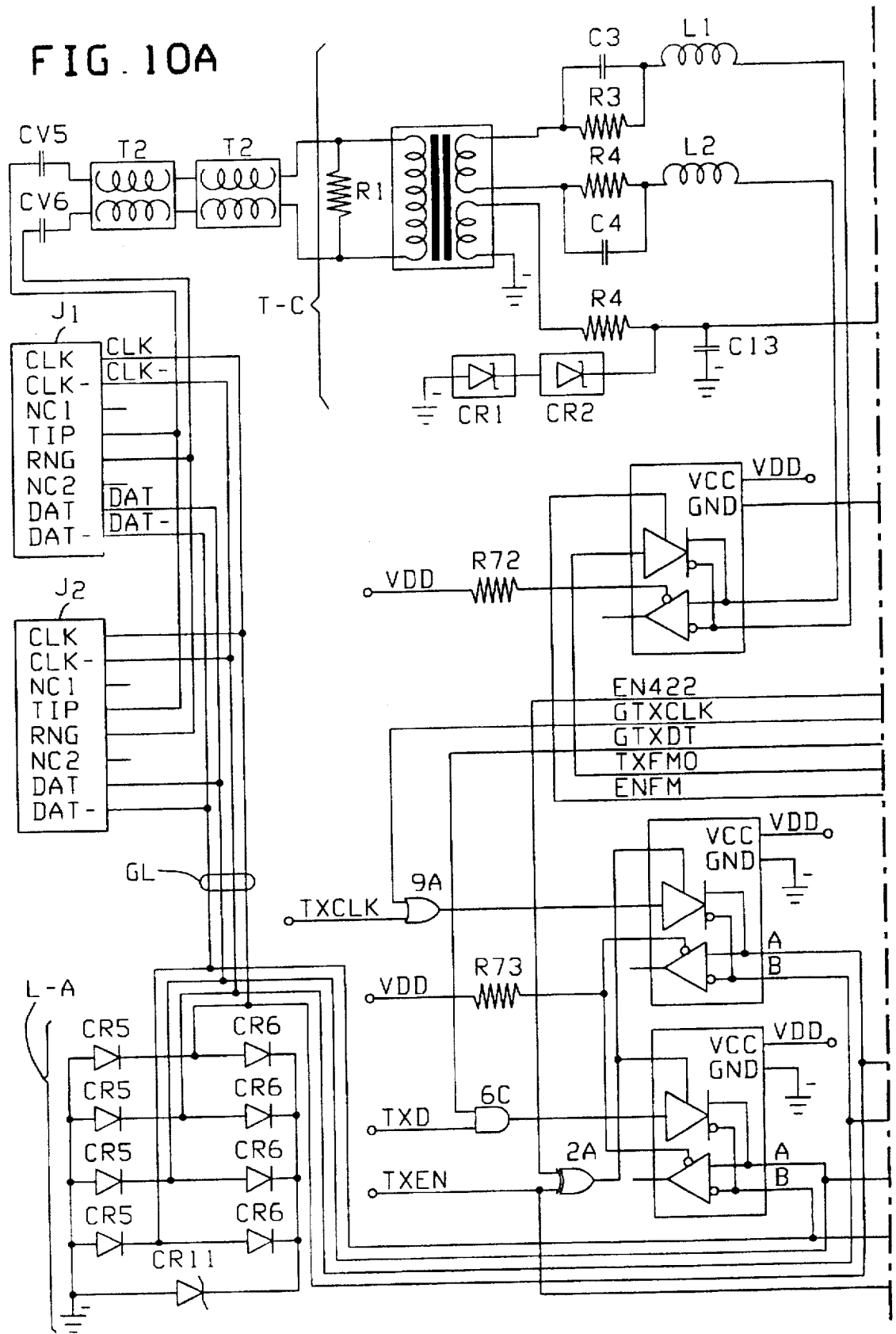
Figure 10B:
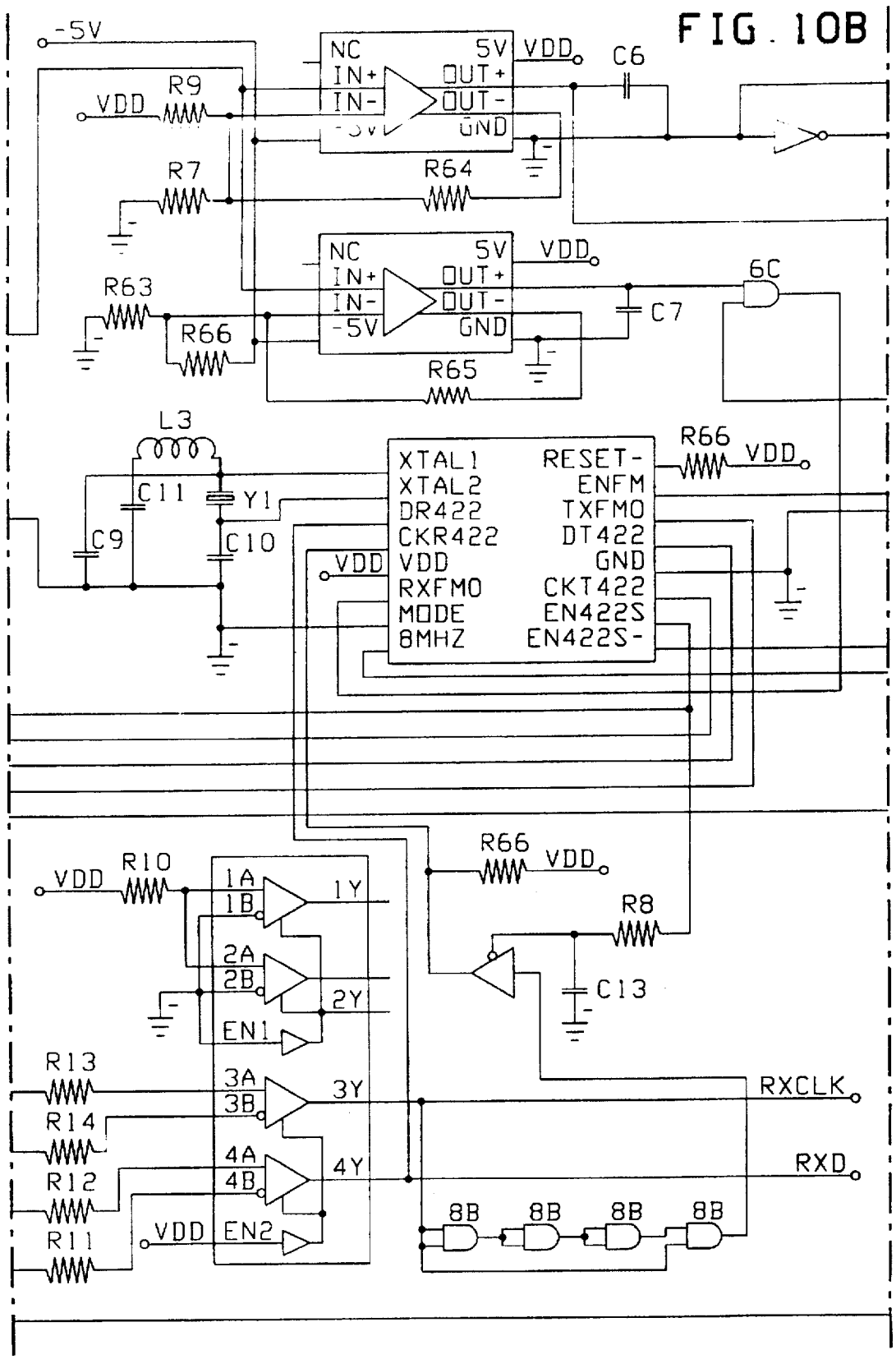

Circuits, FIGS. 5–10:

FIG. 5–10 give preferred circuit implementation of salient aspects of "NET Card" NC described above (correlated with Block Diagram of FIG. 3). FIG. 5 is a capacitive anti-noise filter circuit. FIG. 6 is the ISA Bus Interface. FIG. 7, shows the CTOS Cluster Controller chip 15 and associated elements, including DMA chip D-C and switch-inputs SW. FIG. 8 shows Boot ROM B-R and associated elements, including the Boot ROM interface IF, clock control stage cc (adapted to select any of three clock rates), 8-position dip-switch SW-1 and 4-position dip switch SW-2. FIG. 9 shows the Buffer Interface (e.g. see Buffer-data interface 7 and Buffer Address Interface 3) plus CTOS I/O Mapper stage 13 (see I/O mapper Im, I/O Address stage 13A and switch-inputs thereto). FIG. 10 shows analog circuits, including a Telecluster stage T-C (interface to UTP, or unshielded twisted pair), RJ45 Jacks J1, J2 and associated interface; Gray cable input G-C, lightning arrester stage L-A and FMO Asic.

It will be understood that the preferred embodiments described herein are only exemplary, and that the invention is capable of many modifications and variations in construction, arrangement and use without departing from the spirit of the invention.

Since modifications of the invention are possible, for example, the means and methods disclosed herein are also applicable to other computers, to other network arrangements, and to other related systems. The present invention is also applicable for enhancing other related CTOS network arrangements.

The above examples of possible variations of the present invention are merely illustrative. Accordingly, the present invention is to be considered as including all possible modifications and variations coming within the scope of the invention as defined by the appended claims.

What is claimed is:

1. An arrangement for internetworking non-CTOS computer means with a network of CTOS terminals, this arrangement including:

non-CTOS computer means and associated system-bus means; N CTOS terminals and associated CTOS-net bus means, coupled and arranged to transfer signals to/from said system-bus means and said terminals; plus associated control means and interface means coupled and adapted to transfer signals between said CTOS-net bus means and said terminals; plus associated network connections, being coupled via a cluster-interface stage which is adapted to handle signals to/from said network connections;

said CTOS-net bus means being adapted to deliver address, data and control signals, plus associated interface logic means; and including a CTOS cluster controller chip intercoupling said cluster-interface stage and said CTOS-net bus means;

wherein said interface means comprises buffer means and associated intermediating buffer control means with said buffer means coupled to said CTOS cluster controller chip via CTOS boot ROM means which includes memory-control input means thereto; and wherein said memory-control input means is inputted from said Buffer means and said Buffer Control means; and wherein said boot ROM is also coupled directly with said Buffer means, being accessed via CTOS server means which is arranged and adapted to transfer the CTOS operating system codes to said non-CTOS computer means.

2. The invention of claim 1 wherein said CTOS-net bus means comprises ISA-bus means adapted to deliver address, data and control signals, plus associated interface logic means.

3. The invention of claim 2 wherein said communication controller means is coupled and adapted to transfer/generate clock and data signals.

4. The invention of claim 3 wherein said communication controller means is also arranged to convert signals from parallel to serial and "packetize" them for said cluster-interface stage.

5. The invention of claim 4 wherein said cluster-interface stage comprises connector means for unshielded "twisted-pair" conductors and/or connector means for "grey cable" conductors.

6. The invention of claim 5 wherein said communication controller means comprises a communication controller integrated circuit chip.

7. The invention of claim 6 wherein said cluster-interface stage is adapted to transmit and receive data and clock signals.

8. The invention of claim 7 wherein said cluster-interface stage comprises one or two like RJ45 shielded connector-plug means.

9. The invention of claim 8 wherein each said plug means is arranged and adapted to accept up to four pairs of RJ45/RJ11 type plugs.

10. The invention of claim 3 wherein said interface logic means comprises address buffer means, data buffer means and intermediating buffer control means for controlling signal flow to/from both buffer means; and wherein said communication controller means includes a CTOS cluster controller chip intercoupling said cluster-interface stage and said CTOS-net bus means; and wherein said data buffer means is coupled to said CTOS cluster controller chip via CTOS Boot Rom means.

11. The invention of claim 10 wherein said Boot ROM means includes memory-control input means thereto.

12. The invention of claim 11 wherein said interface logic means comprises address buffer means, data buffer means and intermediating buffer control means for controlling signal flow to and from both buffer means; wherein said memory-control input means is inputted from both said Buffer means and said Buffer Control means; and wherein said Boot ROM is also coupled directly with both said Buffer means.

13. The invention of claim 10 wherein said CTOS cluster controller ship is provided with CTOS I/O Mapper means as input thereto.

14. The invention of claim 13 wherein said interface logic means comprises address buffer means, data buffer means and intermediating buffer control means for controlling signal flow to and from both buffer means; and wherein said Mapper means is coupled with all said interface logic means via I/O control means and is also coupled directly with said address buffer means.

15. The invention of claim 2 wherein said interface logic means comprises address buffer means, data buffer means and intermediating buffer control means for controlling signal flow to and from both said buffer means.

16. The invention of claim 2 wherein said cluster-interface stage comprises a first channel including RS485 interface means and a second channel including interface means for an unshielded twisted pair of conductors.

17. The invention of claim 16 wherein said second channel includes means to pre-process, noise-filter and pulse shape signals for transmission over said twisted pair conductors.

18. The invention of claim 17 wherein said second channel includes FAO-ASIC means in serial with Telecluster UTP interface means.

19. The invention of claim 2 wherein said interface logic means comprises address buffer means, data buffer means and intermediating buffer control means for controlling signal flow to/from both buffer means; and wherein said cluster-interface stage comprises a first channel including RS485 interface means and a second channel including interface means for an unshielded twisted pair of conductors, and wherein said second channel includes means to pre-process, noise-filter and pulse shape signals for transmission over said twisted pair conductors.

20. The invention of claim 2 wherein said CTOS network is a telecluster type and where said cluster-interface stage is coupled to the CTOS-Telecluster network.

21. The invention of claim 2 wherein said cluster-interface stage is coupled to RS485 cluster means.

22. The invention of claim 1 wherein said communication controller means includes a CTOS cluster controller chip intercoupling said cluster-interface stage and said CTOS-net bus means.

23. The invention of claim 1 wherein said network of CTOS terminals is accessed via CTOS server means which is arranged and adapted to transfer the CTOS operating system codes to said non-CTOS computer means.

24. The invention of claim 23 wherein said CTOS operating codes include a selectable security-access code and wherein said communication control means includes security-verification means including security-memory means for storing the same selectable security-access code as is included in said CTOS operating codes plus compare means for comprising these access codes and generating "OK-to-operate" signals responsive to match of said codes, and wherein said communication control means is also adapted to disable operation of said CTOS operating codes in said non-CTOS computer means unless/until such "OK-to-operate" signals are generated.

25. The invention of claim 24 wherein said security-verification means is prescribed Boot ROM means.

26. The invention of claim 1, wherein said communication control means includes a Boot ROM for limiting CTOS operation to instances where a given security code in the CTOS software is matched by the same security code in the Boot ROM.

27. The invention of claim 1, wherein said CTOS operating codes include a selectable security-access code and wherein said control means includes security-verification means including security-memory means for storing the same selectable security-memory means for storing the same selectable security-access code as in included in said CTOS operating codes plus compare means for comparing these access codes and generating "OK-to-operate" signals responsive to match of said codes, and wherein said communication control means is also adapted to disable operation of said CTOS operating codes in said non-CTOS computer means unless/until such "OK-to operate" signals are generated.

28. The invention of claim 27, wherein said security-verification means comprises prescribed boot ROM means.

29. An arrangement for internetworking non-CTOS computer means with a network of CTOS terminals, this arrangement including:

non-CTOS computer means and associated system-bus means, N CTOS terminals and associated CTOS-net bus means coupled and arranged to transfer signals to/from said system-bus means and said terminals plus associated control means and interface means coupled and adapted to transfer signals between said CTOS-net bus means, and said terminals and also associated network connections, being coupled via a cluster-interface stage which is adapted to handle signals to/from said network connections;

said CTOS-net bus means being adapted to deliver address, data and control signals, plus associated interface logic means; plus address buffer means coupled and arranged to drive local address bus means of said non-CTOS computer means; data buffer means for driving the local data bus means of said non-CTOS computer means and buffer control-interface means for selectively coupling the outputs of said buffer means to CTOS coupling means coupled to said network of CTOS terminals.

30. An arrangement for internetworking non-CTOS computer means with a network of CTOS terminals, this arrangement including:

non-CTOS computer means and associated system-bus means, N CTOS terminals and associated CTOS-net means coupled and arranged to transfer signals to/from said system-bus means and said terminals plus associated control means and interface means coupled and adapted to transfer signals between said CTOS-net bus means, and said terminals and also associated network connections, being coupled via a cluster-interface stage which is adapted to handle signals to/from said network connections;

said CTOS-net bus means being adapted to deliver address, data and control signals, plus associated interface logic means; plus communication control means coupled and adapted to transfer signals to said cluster-interface stage and net-interface means coupled and adapted to transfer signals between said CTOS-net bus means and said communication controller means and associated network connections, via a cluster-interface stage which is adapted to handle signals to/from said network connections.

* * * * *